Patented June 7, 1949

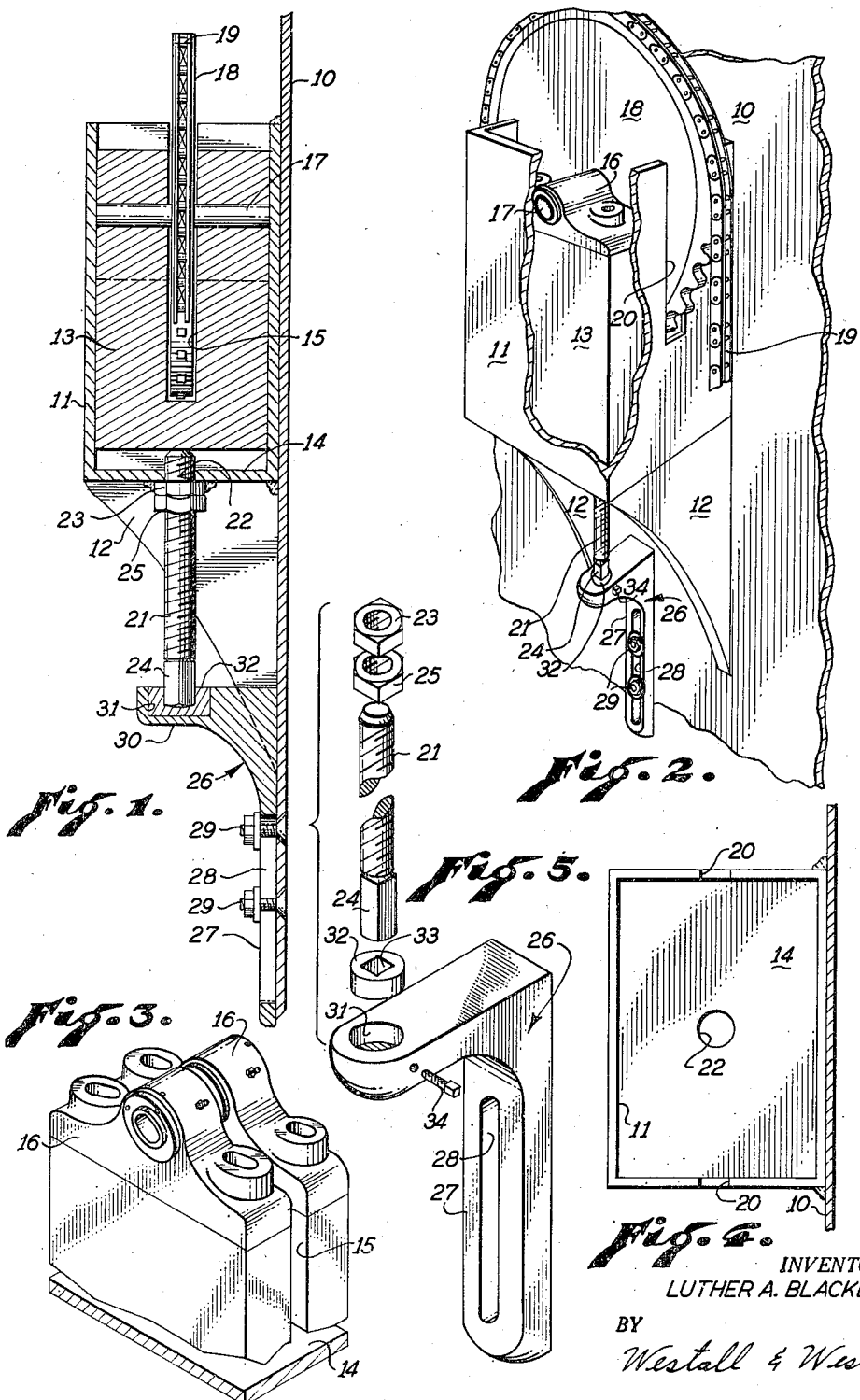

2,472,461

UNITED STATES PATENT OFFICE 2,472,461

CHAIN SUPPORT

Luther A. Blackburn, Lynwood, Calif.

Application September 13, 1946, Serial No. 696,665

4 Claims. (Cl. 74—242.14)

This invention relates to chain supports, and more specifically contemplates sprocket adjusting mechanisms for varying the tension of chains carried by the sprockets.

Apparatus of the prior art utilizing endless chains for transmitting power between various mechanisms are well known in the art and usually embody some means for absorbing undesirable slack in the chains after preliminary adjustment of their lengths by the insertion or removal of links, is effected. To this end it is common practice in such chain structures to slidably mount the bearings for the idler sprocket whereby the latter may be shifted to produce or take up slack in the chain, locking means being provided to retain the sprocket in position when the chains are drawn taut. However, in heavy constructions it is very often difficult to manipulate the bearings and sprocket with the weight of the chain thereon, critical adjustment being impossible in many cases.

Endless drive chains comprise a part of modern oil well pumping units wherein the chains are arranged vertically at opposite sides of the well to reciprocate a crosshead in which the upper end of the polished rod of the pump is clamped. In order to assure the continued balance and smooth motion of the crosshead, it is essential that the tension of the chains be substantially uniform. In such apparatus the sprockets at the lower ends of the chains are connected to the source of power and accordingly cannot be easily adjusted. Slack in the chains must, therefore, be taken up by elevation of the upper sprockets, and due to the weight of these parts auxiliary equipment is required to obtain the required uniform adjustment of the chains.

It is a principal object of the invention to provide a novel chain supporting assembly for rotatably carrying a sprocket shaft, in combination with means to resist lateral displacement of the supporting assembly and compel movement thereof in a direction opposed to the tension of the chain operatively engaged with the sprocket.

More specifically, an object hereof is the provision of a slotted box adapted to be mounted upon a suitable support, in which a bearing block, having a slot therein registering with the slot in the box, is disposed, for the accommodation of a sprocket journalled in bearings carried by the block, one end of the box being open to permit movement of the block and sprocket through the open end of the box while resisting all movement in the lateral direction.

Another and highly important object hereof is to provide a screw mechanism for positively supporting and shifting the sprocket assembly in combination with a novel locking device for the screw operable to obviate rotative misadjustment thereof incident to vibration of the unit or in response to the weight transmitted by the chain and sprocket through the screw during operation.

Still other objects and advantages of the invention, such for example as simplicity of construction, ease of operation, positive action, and durability, will be apparent from a consideration of the following description.

In the drawings:

Fig. 1 is a longitudinal sectional view through one embodiment of my invention, depicting the unit mounted for use;

Fig. 2 is a perspective view, partially broken away, of the assembly illustrated in Fig. 1;

Fig. 3 is a perspective view of the bearing block assembly employed in the embodiment of my invention shown in Figs. 1 and 2;

Fig. 4 is a plan view of the box-type housing for the bearing block shown in Fig. 3;

Fig. 5 is an exploded perspective view of the screw-adjusting device and the locking means therefor.

Referring to the drawings in detail, the numerals of which indicate similar parts throughout the several views, 10 designates generally a mounting consisting of a plate, beam, or the like for the support of an idler sprocket, hereinafter referred to, which apparatus may comprise a part of any of various types of mechanisms utilizing endless chains for the transmission of power. To one surface of mounting 10, a box retainer 11 is secured by welding or the like. The box 11 may be of any cross-sectional contour, but is preferably square or rectangular as illustrated. One end of box 11 is open and the box is positioned with its open end directed away from the drive sprocket assembly (not shown) associated with the opposite end of an endless chain for the support of which the idler sprocket assembly is provided, as is hereinafter described. Thus in the chain structures embodied in pumping units of the character above referred to, the open end of box 11, in which the upper sprocket is to be housed, is directed upwardly. 12 indicates braces to reinforce and support the position of the box in its described welded relationship with mounting 10.

A movable bearing support comprising a block 13 is housed within box 11, the cross-sectional dimensions of the block approximating those of the inside of the box, whereby lateral movement of the block within the box is obviated without restricting vertical movement thereof above the bottom 14 of the box. The upper end of block 13 is slotted vertically as at 15, and a pillow block 16 of conventional construction, incorporating preferably self-aligned roller bearings, is mounted to the upper surface of block 13 at each side of slot 15. The ends of a sprocket shaft 17 of a length equal to or slightly less than the width of box 11 are rotatably carried by the respective pillow blocks 16. The slot 15 in block 13 is of a depth sufficient to accommodate the lower half of a sprocket 18 mounted on shaft 17 intermediate the ends of the latter so as to assure its unrestricted rotation in response to movement of an endless chain 19 engaged with the teeth of sprocket 18 projecting radially from the upper half of the latter. In order to assure adequate spacing of the parallel reaches of chain 19 from box 11, the latter is of a length somewhat less than the diameter of sprocket 18. Thus the sprocket projects through the slotted sides of block 13, and the corresponding ends of box 11 are also slotted as at 20 to register with slots 15 for the extension of the opposite vertical peripheral arcs of the sprocket 18.

It will be appreciated that with the sprocket supporting the upper end of endless chain 19, tensioning of the chain can be accomplished by elevation of block 13. To this end, I provide a screw 21 which is projected through a central hole 22 in the bottom 14 of box 11 to bear against and support the block. Screw 21 is threaded through a nut 23 encircling hole 22 and welded to the undersurface of bottom 14. The lower end of screw 21 is formed with a wrench head 24 by which the upper end of the screw may be threaded into box 11 to elevate the block 13.

A feature of the invention resides in the composite locking means for preventing rotative misadjustment of screw 21 which includes a conventional lock nut 25 carried by the screw and adapted to be threaded against nut 23 to frictionally bind the screw against movement after the desired adjustment is effected. A supplementary locking assembly for screw 21 is provided below box 11 and is operable to engage the wrench head 24 of the screw. This device consists of an inverted L-shaped bracket 26, the vertical leg 27 of which is arranged in contiguous relation with the mounting 10 in the transverse plane of screw 21. Leg 27 is longitudinally slotted as at 28 through which slot a pair of bolts 29 extend for securing bracket 26 to mounting 10. The bolts 29 are spaced apart a distance considerably less than the length of slot 28 whereby bracket 26, with the bolts loosened, may be vertically adjusted within the limits defined by the ends of slot 28. The outer end of the horizontally disposed section 30 of bracket 26 is formed with a circular recess 31 located in vertical alignment with screw 21. A cylindrical collar 32 accommodated within recess 31 so as to freely rotate therein, is provided with an opening 33 of a size and shape to telescope over the wrench head 24 of screw 21 and resist relative movement, when so arranged, between the collar and screw. It will be understood that bolts 29 by which bracket 26 is fastened to mounting 10 are so positioned to assure a range of movement slightly greater than the movement required for the installation of chain 19 upon and complete adjustment of sprocket 18, for a purpose hereinafter described. When engaged with the wrench head 24 of screw 21, the collar 32 is locked against rotative movement by a set screw 34 threaded through the horizontal section 30 of bracket 26 into the recess 31.

The operation and application of my invention is further briefly described as follows: The box 11 is preliminarily mounted in position at approximately the location at which the idler sprocket 18 is to be supported. The block 13, with the sprocket, shaft 17 and pillow blocks 16 associated therewith as hereinabove described, is lowered into the box, and the endless chain 19 is then engaged with the upper arc of the sprocket with its opposite reaches depending therefrom at respective sides of the box toward the lower drive sprocket (not shown). With the lock nut 25 loosened and bracket 26 and collar 32 disassociated with wrench head 24 of the screw 21, the latter is then rotated to thread the upper end of the screw against the underside of block 13 so as to elevate sprocket 18 journalled in the pillow blocks 16 carried thereby. Chain 19 is thus critically tensioned. To prevent disturbance of this adjustment, the lock nut 25 is tightened and bracket 26 is elevated to engage collar 32 with the wrench head 24, whereupon the bracket 26 is securely fastened in place. The set screw 34 is then threaded tightly against collar 32 to prevent its rotation, supplementing the lock nut 25 in securely binding screw 21 against rotative disadjustment.

The precise construction of any particular embodiment hereof will of course vary in accordance with specific requirements, and, as will be obvious to those of skill in the art to which my invention appertains, numerous changes in size, design and shape of the various parts may be made, collar 32 may be omitted, the extreme lower end of screw 21 being formed with an annular recess or bearing surface for the engagement of the set screw 34, additional screw and locking assemblies may be employed to distribute the weight of the load carried by the chain, a single block may be slotted to accommodate a plurality of sprockets 18 for supporting separate chains, and further the adjusting and locking means of my invention is equally well adapted and operable for tensioning chains disposed at any angle or for adjusting idler sprockets located at the lower end of vertically disposed chains—all without departing from the spirit of my invention as defined in the appended claims.

What I claim and desire to secure by Letters Patent is:

1. In a device for supporting an endless chain, a stationary support, a casing, having an open end, secured to said support, a pair of pillow blocks, means to hold said pillow blocks in spaced relationship within said casing, an adjusting screw threaded through the end of said casing opposite to the open end thereof and bearing upon said means to vary the position of the pillow blocks, and a sprocket journalled between said pillow blocks.

2. In a device for supporting an endless chain, a stationary support, a casing, having an open end, secured to said support, a slotted mounting block snugly and slidably accommodated within said casing, a pair of bearings carried by said mounting block, a shaft journalled in said bearings, a sprocket within the slot of said mounting block carried by said shaft, and a screw threaded through said casing and bearing against said mounting block to shift said block and the bearings carried thereby toward and away from the open end of said casing.

3. In a device for supporting an endless chain, a stationary mounting, a slotted block, a frame carried by said mounting to maintain said block adjacent said mounting in movement parallel to the latter, a screw threaded in said frame and bearing against said block, means comprising a bracket slidably carried by said mounting and movable into and out of engagement with the head of said screw to hold the latter against rotation, and means to lock said first-named means to said mounting in a position engaged with the head of said screw, and a sprocket rotatably carried by and movable with said slotted block.

4. In a device for supporting an endless chain, a stationary mounting, a slotted block, a frame for guiding said block through movement parallel to said mounting, a screw threaded through the frame and bearing against said block to shift the latter incident to rotation of said screw, a slotted bracket, means extending through the slot in said bracket to secure the latter to said mounting in either of two positions lying in the plane of said screw, said bracket including a lateral section having a recess therein adapted to receive the head of said screw, a socket element accommodated in said recess to grip the head of said screw, and means associated with said bracket to hold the socket and bracket immovable, said socket being disengaged from said screw incident to movement of said bracket relative to said mounting.

LUTHER A. BLACKBURN.

REFERENCES CITED

The following references are of record in the file of this patent:

UNITED STATES PATENTS

| Number | Name | Date |
|---|---|---|
| 303,977 | Hanney | Nov. 24, 1885 |
| 448,583 | Medart | Mar. 17, 1891 |